United States Patent
Chertok et al.

(10) Patent No.: US 8,526,760 B2
(45) Date of Patent: Sep. 3, 2013

(54) MULTI-SCALE REPRESENTATION OF AN OUT OF FOCUS IMAGE

(75) Inventors: Michael Chertok, Tel Aviv-Yafo (IL); Adi Pinhas, Hod Hasharon (IL)

(73) Assignee: Superfish Ltd., Petah Tikva (IL)

( * ) Notice: Subject to any disclaimer, the term of this patent is extended or adjusted under 35 U.S.C. 154(b) by 475 days.

(21) Appl. No.: 12/812,882

(22) PCT Filed: Jan. 14, 2009

(86) PCT No.: PCT/IL2009/000055
§ 371 (c)(1),
(2), (4) Date: Jul. 14, 2010

(87) PCT Pub. No.: WO2009/090641
PCT Pub. Date: Jul. 23, 2009

(65) Prior Publication Data
US 2010/0310179 A1    Dec. 9, 2010

Related U.S. Application Data

(60) Provisional application No. 61/021,705, filed on Jan. 17, 2008.

(51) Int. Cl.
*G06K 9/64* (2006.01)
*G06K 9/32* (2006.01)

(52) U.S. Cl.
USPC ............................................ 382/279; 382/298

(58) Field of Classification Search
None
See application file for complete search history.

(56) References Cited

U.S. PATENT DOCUMENTS
7,606,442 B2 * 10/2009 Pilu ................................ 382/298

OTHER PUBLICATIONS

Lindeberg, Tony. "Scale-space: A framework for handling image structures at multiple scales." CERN European Organization for Nuclear Research—Reports—CERN (1996): 27-38.*
Witkin, Andrew. "Scale-space filtering: A new approach to multi-scale description." Acoustics, Speech, and Signal Processing, IEEE International Conference on ICASSP'84.. vol. 9. IEEE, 1984.*
International Search Report on PCT/IL2009/000055, dated May 19, 2009, 2 pages.
Kpalma et al., "A Novel Multi-scale Representation fo 2-D Shapes" Image Analysis and Recognition, vol. 4633, Aug. 22, 2007, pp. 423-435.
Li et al., "A Multiscale Antidiffusion Approach for Gaussian Blurred Images", Proceedings of the International Conference on Image Processing, Santa Barbara, Cal, Oct. 26, 1997 (pp. 238 241).
Rebelo et al., "Multiscale representation for automatic identification of structures in medical images", Computers in Biology and Medicine vol. 37, No. 8, Jul. 26, 2007, 1183-1193 (12 pages).
Rooms et al., "Estimating image blur in the wavelet domain", International Conference on Acoustics Speech, and Singal Processing, Jul. 8, 2002 (6 pages).

* cited by examiner

*Primary Examiner* — Shefali Goradia
(74) *Attorney, Agent, or Firm* — Goodwin Procter LLP

(57) ABSTRACT

A method for generating a multi scale representation of an input image, the method comprising the procedures of: estimating a scale factor corresponding to said input image; determining a set of Gaussian difference kernels according to said estimated scale factor, and according to a predetermined set of Gaussian kernels; and generating a multi-scale representation of said input image by applying each of said set of Gaussian difference kernels on said input image.

17 Claims, 4 Drawing Sheets

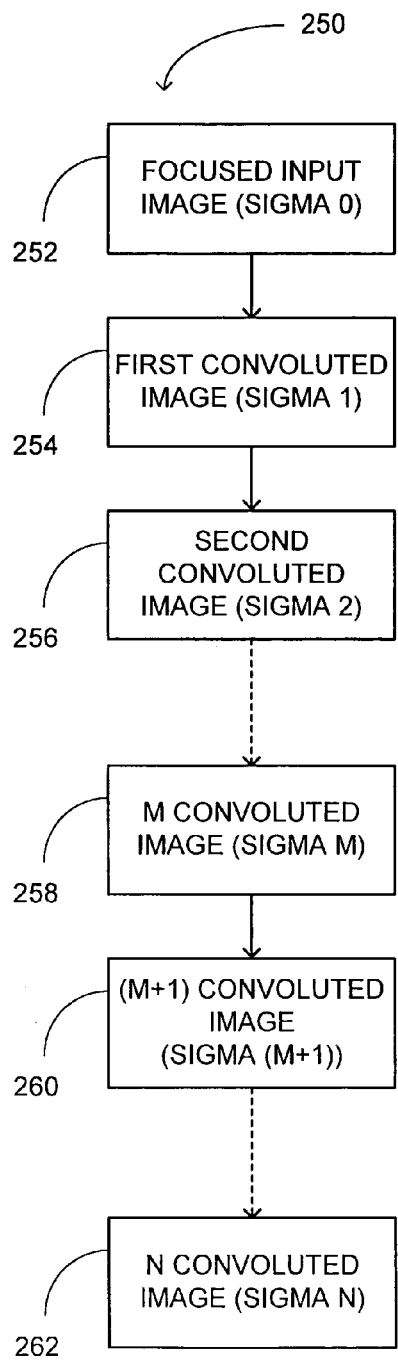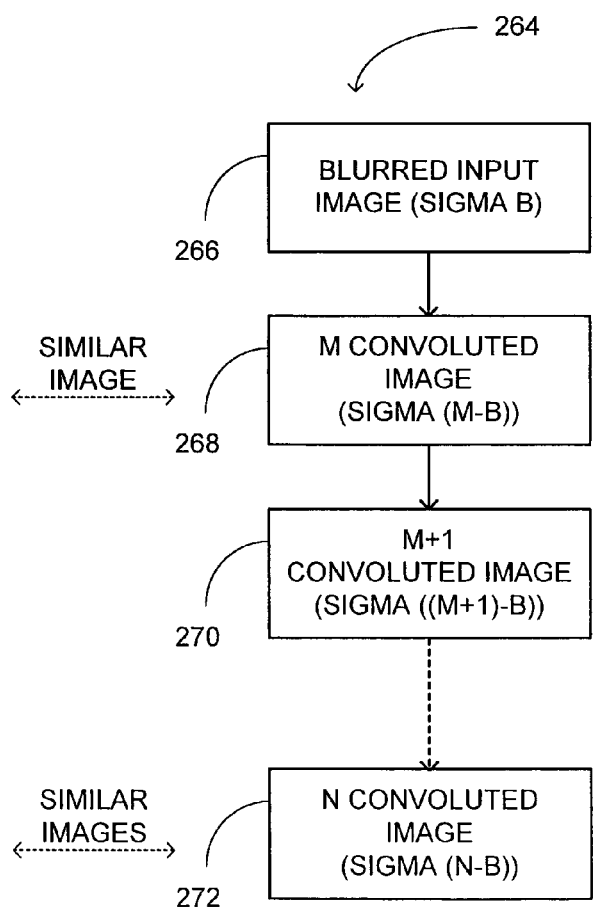
FIG. 6A
FIG. 6B

MULTI-SCALE REPRESENTATION OF AN OUT OF FOCUS IMAGE

CROSS-REFERENCE TO RELATED APPLICATIONS

This application is the national phase of International (PCT) Patent Application Serial No. PCT/IL2009/000055, filed on Jan. 14, 2009, published under PCT Article 21(2) in English, which claims priority to and the benefit of U.S. Provisional Patent Application No. 61/021,705, filed on Jan. 17, 2008, the disclosure of each of which is incorporated herein by reference in its entirety.

FIELD OF THE DISCLOSED TECHNIQUE

The disclosed technique relates to multi-scale representation of a signal, in general, and to methods and systems for generating a multi-scale representation of an out-of-focus image, in particular.

BACKGROUND OF THE DISCLOSED TECHNIQUE

Multi-scale representation of an input image is employed in many visual processing applications such as feature detection (e.g. edge, blob, junction or ridge), feature classification, object recognition, object classification, image classification, shape analysis, and the like. A plurality of images, each of the images is at a different scale, are generated by smoothing the input image with ascending Gaussian kernels.

Optical blurring of an input image, resulting from the input image being out-of-focus, is modeled as a convolution of an input focused image with a Gaussian kernel of certain variance value. The value of the variance of the convolving Gaussian kernel corresponds to the blur level of the input image. Image convolution with a Gaussian kernel is described by equation (1):

$$f*g(\sigma_3) = (f*g(\sigma_1))*g(\sigma_2); \quad \sigma_3 = \sqrt{(\sigma_1^2 + \sigma_2^2)} \quad (1)$$

f—A focused image
g—A Gaussian kernel of certain variance
*—A convolution operator.

When the input image is blurred (i.e., out-of-focus input image), generating a multi-scale representation of the input image, might result in a removal of important details from the image (i.e., over smoothing the input image). One way of overcoming the over-smoothing problem of a blurred input image, is to reconstruct a focused image from the blurred image by estimating the Gaussian kernel corresponding to the blur level of the image, de-convolving the input image with the estimated Gaussian kernel, and generating a multi-scale representation of the de-convolved image.

Reference is now made to FIG. 1, which is a schematic illustration of a method for generating a multi-scale representation of a blurred input image, operative as known in the art. In procedure 100, a Gaussian kernel, corresponding to the blur level of the input image, is estimated. The Gaussian kernel estimation is achieved by any of the blur level estimation techniques known in the art. In procedure 102, the blurred input image is de-convolved in order to reconstruct a focused image. The blurred image is de-convolved according to the Gaussian kernel, corresponding to the blur level of the image, estimated in procedure 100. In procedure 104, a multi-scale representation of the de-convolved image is generated by convolving the de-convolved image with a plurality of Gaussian kernels of ascending values of variance. In procedure 106, a visual processing is performed on the multi-scale representation of the input image.

Reference is now made to "Scale space theory in computer vision" by Tony Lindeberg, a book published by Springer (1994). This publication is directed at a formal framework, scale-space representation, for handling the notion of scale in image data. The book gives an introduction to the general foundations of the scale space theory and shows how it applies to essential problems in computer vision such as computation of image features.

Reference is now made to an article entitled "Estimating Image Blur in The Wavelet Domain", by Filip Rooms et al. This reference is directed to a method for estimating the blur level of an input image, according to information contained in the input image. A blurred image is modeled as the corresponding focused image convolved with a Point Spread Function (PSF). The method includes the procedures of: calculating the Lipschitz exponent; generating a histogram; and estimating the blur of the image according to the center of gravity of the histogram and according to the maximum of the histogram. The Lipschitz exponent is calculated in all points, where there is a change in intensity in either the horizontal or the vertical direction. The histogram of the Lipschitz exponents, of the blurred image, is a single peak histogram with a certain distribution around that peak. The blur level of the image is estimated according to the center of gravity of the distribution around the peak and according to the maximum of the peak.

Reference is now made to an article entitled "Pyramid Method in Image Processing" written by E. H. Adelson et al. This reference is directed to a method for constructing an image pyramid of different resolutions. The image pyramid is employed for a variety of visual processing applications such as pattern recognition. The image pyramid consists of a sequence of copies of an original image in which both sample density and resolution are decreased. The method includes the procedures of convolving the original image with a set of Gaussian-like weighing functions, subtracting each Gaussian pyramid level from the next lower level in the pyramid, and interpolating sample values between those in a given level before that level is subtracted from the next lower level.

A zero level of the pyramid is the original image. The convolution procedure acts as a low-pass filter with the band limit reduced by one octave, with each level, correspondingly. The procedures of subtracting and interpolating act as a band-pass filter. The procedure of interpolating is necessary since the subtraction is between levels of different sample densities.

SUMMARY OF THE PRESENT DISCLOSED TECHNIQUE

It is an object of the disclosed technique to provide a novel method and system for generating a multi-scale representation of an input out-of-focus image, which overcomes the disadvantages of the prior art.

In accordance with the disclosed technique, there is thus provided a method for generating a multi-scale representation of an input image. The method comprising the procedures of: estimating a scale factor corresponding to the input image; determining a set of Gaussian difference kernels; and generating a multi-scale representation of the input image.

The procedure of determining the set of Gaussian difference kernels is performed according to the estimated scale factor, and according to a predetermined set of Gaussian kernels. The procedure of generating a multi-scale representation is performed by applying each of the set of Gaussian difference kernels on the input image.

In accordance with another aspect of the disclosed technique, there is thus provided a system for generating a multi-scale representation of an input image, the system comprising: a scale space level estimator; and a multi-scale representation generator. The scale space level estimator estimates a scale factor corresponding to the input image. The multi-scale representation generator is coupled with the scale space level estimator.

The multi-scale representation generator receives the estimated scale factor, and determines a set of Gaussian difference kernels according to the estimated scale factor and according to a predetermined set of Gaussian kernels. The multi-scale representation generator further generates a multi-scale representation of the input image by applying each of the set of Gaussian difference kernels to the input image.

BRIEF DESCRIPTION OF THE DRAWINGS

The disclosed technique will be understood and appreciated more fully from the following detailed description taken in conjunction with the drawings in which:

FIG. 6A, is a schematic illustration of a multi-scale representation of an input focused image, generally referenced 250, constructed in accordance with a further embodiment of the disclosed technique; and FIG. 6B, is a schematic illustration of a multi-scale representation of an input blurred image, generally referenced 264, constructed in accordance with another embodiment of the disclosed technique.

DETAILED DESCRIPTION OF THE EMBODIMENTS

The disclosed technique overcomes the disadvantages of the prior art by generating a multi-scale representation of a hypothetic focused image that relates to the blurred input image, without reconstruction of the focused image. The multi-scale representation starts at a scale level, which is lower than that of the blurred input image.

According to one embodiment of the disclosed technique, the multi-scale representation of the hypothetic focused image is produced by the procedures of estimating the blur level of a blurred input image (i.e., estimating the value of the variance of the Gaussian kernel corresponding to the blur level of the image—the scale factor), generating a set of Gaussian difference kernels from a set of pre-determined Gaussian kernels, and convolving the input image with the set of Gaussian difference kernels.

The value of variance of each of the set of Gaussian difference kernels is determined from formula (2):

$$\sigma_{diff} = \sqrt{\sigma_{required}^2 - \sigma_{blur}^2} \quad (2)$$

$\sigma_{diff}$—is the value of variance of a specific Gaussian difference kernel.

$\sigma_{required}$—is the value of variance of a predetermined difference Gaussian, corresponding to the specific Gaussian difference kernel.

$\sigma_{blur}$—is the estimated value of variance of the blurred input image (i.e., the blur level).

Formula (2) is derived from formula (1). It is noted, that when the value of variance of the estimated Gaussian kernel is higher than that of a certain Gaussian kernel, that certain Gaussian kernel is omitted from the set of Gaussian difference kernels.

The term "Multi-scale representation" herein below refers to a representation of an image by a set of images, each of the images relating to a different scale. Each of the images in the multi-scale representation is generated by convolving the original image with a respective Gaussian kernel. The value of variance of a Gaussian kernel, employed for generating an image of the multi-scale representation, is referred to as a scale factor. The scale factors of the multi-scale representation are of ascending order. By convolving the input image with a Gaussian kernel, image structures of spatial size, which corresponds to the scale factor, are removed from that image (i.e., image structures are smoothed from the image by convolution). The term "Scale space level" herein below refers to the position of an image within a multi-scale representation (i.e., a scale space level corresponds to the value of the variance of a Gaussian kernel—scale factor).

Figure 2:
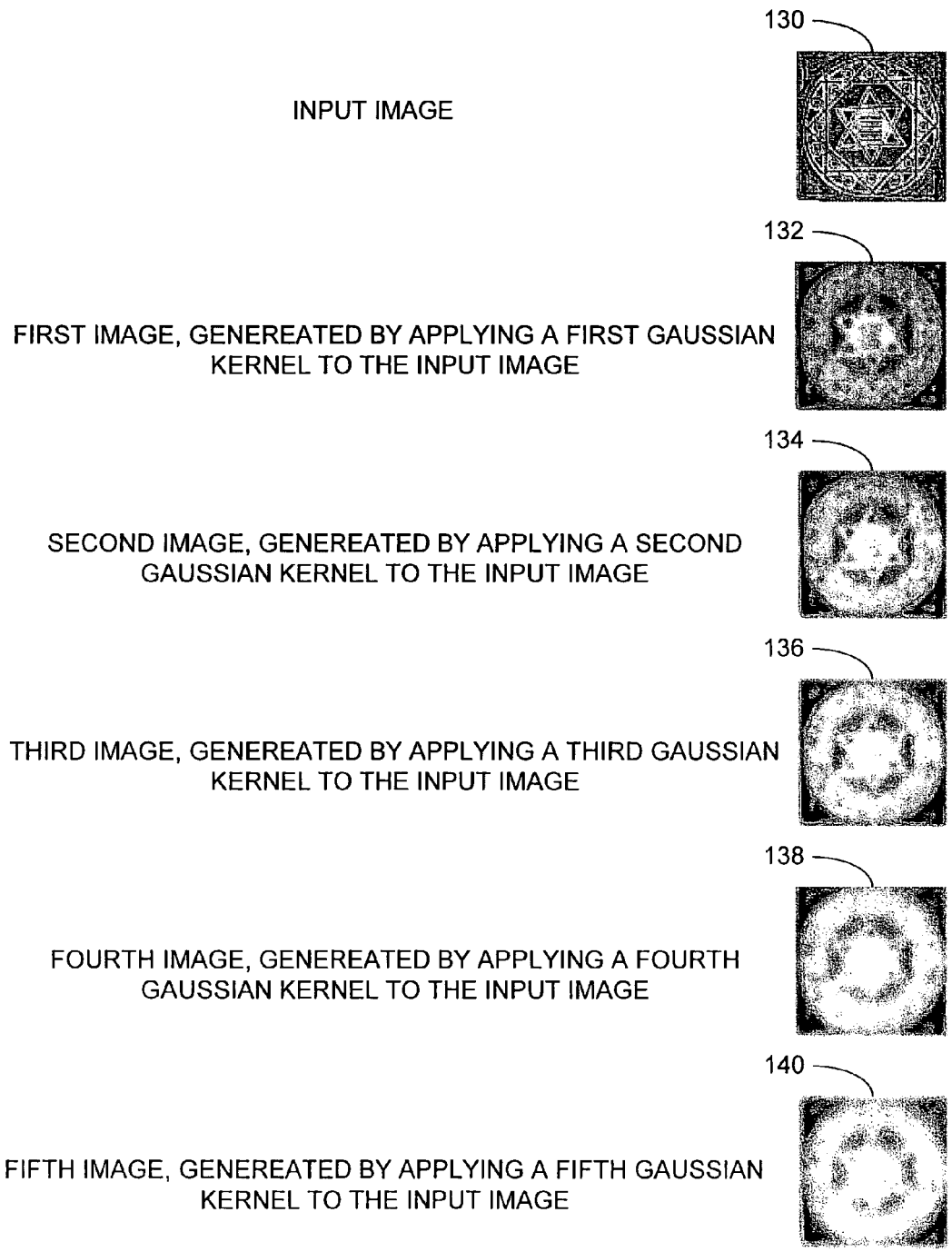
FIG. 2, is a schematic illustration of a scale space representation of an input image, constructed in accordance with an embodiment of the disclosed technique.

Reference is now made to FIG. 2, which is a schematic illustration of a scale space representation of an input image, constructed in accordance with an embodiment of the disclosed technique. FIG. 2 includes an input image 130, a first image 132, a second image 134, a third image 136, a fourth image 138, and a fifth image 140. First image 132 is generated by applying a first Gaussian (not shown) having a first scale factor (not shown) to input image 130. Second image 134 is generated by applying a second Gaussian (not shown) having a second scale factor (not shown) to input image 130. It is noted, that the second scale factor is larger than the first scale factor.

Third image 136 is generated by applying a third Gaussian (not shown) having a third scale factor (not shown) to input image 130. It is noted, that the third scale factor is larger than the second scale factor. Fourth image 138 is generated by applying a fourth Gaussian (not shown) having a fourth scale factor (not shown) to input image 130. It is noted, that the fourth scale factor is larger than the third scale factor. Fifth image 140 is generated by applying a fifth Gaussian (not shown) having a fifth scale factor (not shown) to input image 130. It is noted, that the fifth scale factor is larger than the fourth scale factor.

Figure 3:
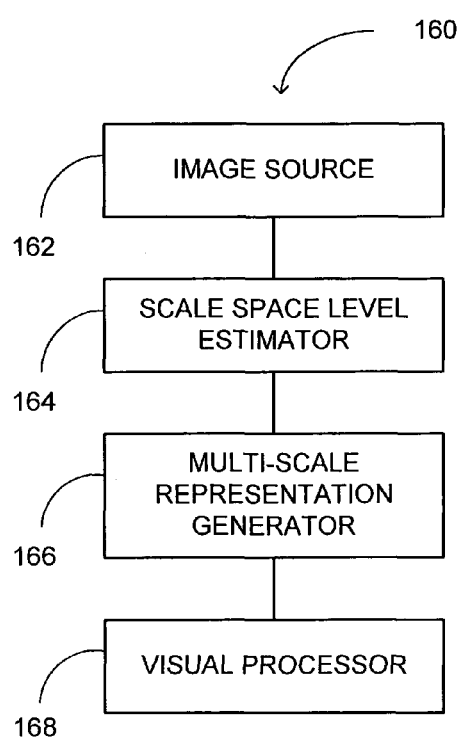
FIG. 3, is a schematic illustration of a system for generating a multi-scale representation of a blurred input image, generally referenced 160, constructed and operative in accordance with another embodiment of the disclosed technique.
Figure 1:
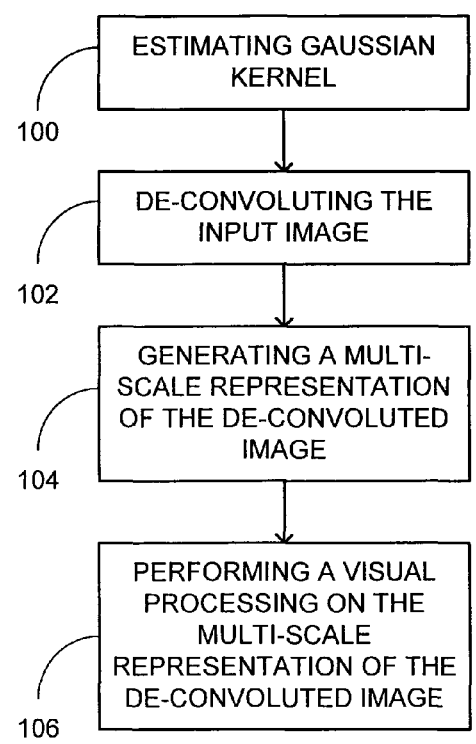
FIG. 1, is a schematic illustration of a method for generating a multi-scale representation of a blurred input image, operative as known in the art.

Reference is now made to FIG. 3, which is a schematic illustration of a system for generating a multi-scale representation of a blurred input image, generally referenced 160, constructed and operative in accordance with another embodiment of the disclosed technique. System 160 includes an image source 162, a scale space level estimator 164, a multi-scale representation generator 166, and a visual processor 168. Image source 162 is coupled with scale space level estimator 164. Space level estimator 164 is coupled with multi-scale representation generator 166. Multi-scale representation generator 166 is coupled with application processor 168. It is noted that, either any pair of, or all of scale space level estimator 164, multi-scale representation generator 166, and visual processor 168 can be integrated together on a single processor.

Image source 162 provides an input image (not shown) to scale space level estimator 164. Image source 162 can be an image capture device, a storage unit storing the input image, a communication interface receiving the input image from an external source (e.g., a network), and the like. Scale space level estimator 164 estimates the scale factor corresponding to the input image (i.e., the scale factor of the Gaussian kernel employed for modeling the input image). The scale factor estimation can be achieved by any of the methods known in the art. Scale space level estimator 164 sends the input image and the estimated scale factor of the input image to multi-scale representation generator 166.

Multi-scale representation generator 166 determines the scale space level of the input image, according to the estimated scale factor thereof. Multi-scale representation generator 166 predetermines a set of Gaussian kernels, each of the Gaussian kernels having scale factor higher than that of the previous Gaussian kernel in the set.

Multi-scale representation generator 166 substitutes each of the values of variance of the pre-determined Gaussian kernels with $\sigma_{required}$ of formula (2):

$$\sigma_{diff} = \sqrt{\sigma_{required}^2 - \sigma_{blur}^2})$$

for generating each of a set of Gaussian difference kernels, respectively. Multi-scale representation generator 166 omits from the set of Gaussian difference kernels every Gaussian kernel having negative scale factor. A negative scale factor is received for each of the set of predetermined Gaussian kernels having scale factor lower than that of the estimated scale factor corresponding to the input image.

Multi-scale representation generator 166 applies each of the Gaussian difference kernels to the input image, for generating a scaled image of the input image. The set of the generated scaled images is referred to as a multi-scale representation of the input image. Multi-scale representation generator sends the multi-scale representation of the input image to visual processor 168. Visual processor 168 performs a visual processing, such as feature detection, feature classification, object recognition, object classification, image classification, shape analysis, and the like, on the multi-scale representation of the input image.

Figure 4:
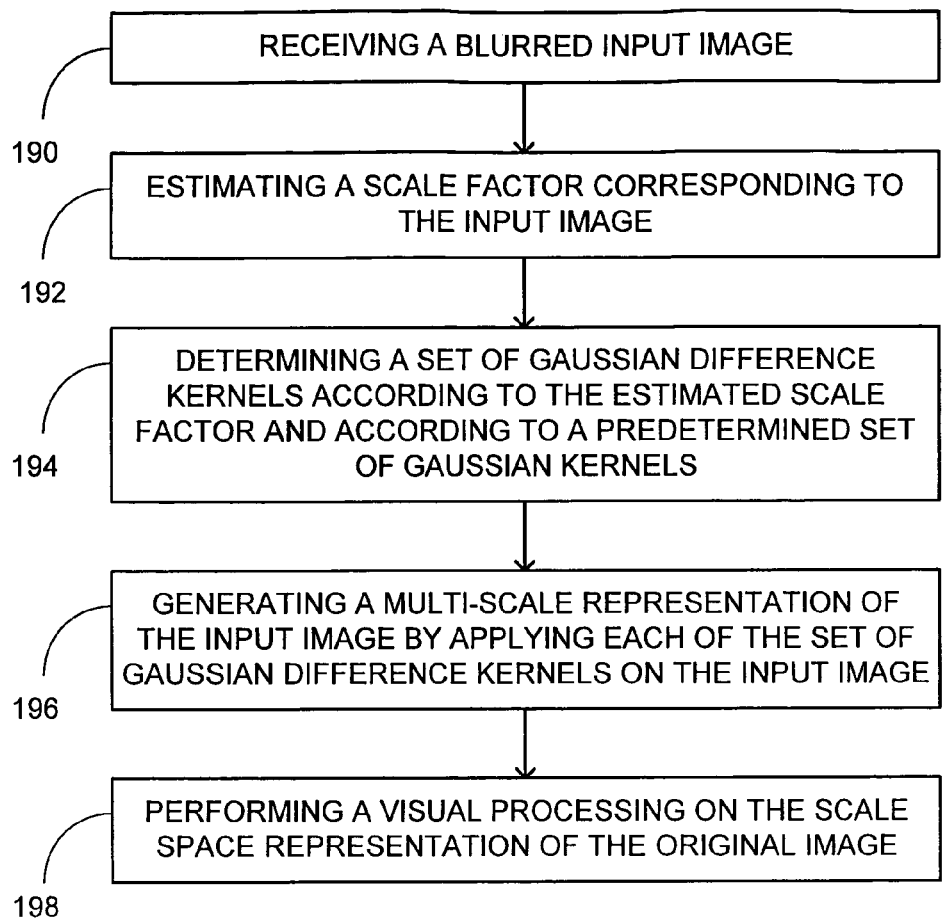
FIG. 4, is a schematic illustration of a multi-scale representation generating method, operative in accordance with a further embodiment of the disclosed technique.

Reference is now made to FIG. 4, which is a schematic illustration of a multi-scale representation generating method, operative in accordance with a further embodiment of the disclosed technique. In procedure 190, an input image is received. With reference to FIG. 3, communication interface 162 receives an input image. In procedure 192, the scale factor corresponding to the input image is estimated (i.e., the blur level of the input image is estimated). With reference to FIG. 3, scale space level estimator 164 estimates the scale factor corresponding to the input image.

In procedure 194, a set of Gaussian difference kernels are determined according to the estimated scale factor and according to a predetermined set of Gaussian kernels. The set of Gaussian difference kernels are determined by formula (2), according to the estimated scale factor corresponding to the input image, and according to each of the scale factors of the predetermined set of Gaussian kernels. The predetermined set of Gaussian kernels is predetermined such that, the scale factors of the Gaussian kernels are of ascending order. With reference to FIG. 3, multi-scale representation generator 166 determines a set of Gaussian difference kernels according to the estimated scale factor and according to a predetermined set of Gaussian kernels.

In procedure 196, a multi-scale representation of the input image is generated by applying each of the set of Gaussian difference kernels to the input image. With reference to FIG. 3, multi-scale representation generator 166 applies each of the set of Gaussian difference kernels to the input image, for generating a multi-scale representation of the input image. Procedure 194 is further detailed in FIG. 5. In procedure 198, a visual processing is performed on the multi-scale representation of the input image. With reference to FIG. 3, visual processor 168 performs a visual processing (e.g., feature detection, feature classification, object recognition, object classification, image classification, and shape analysis) on the multi-scale representation of the input image.

Figure 5:
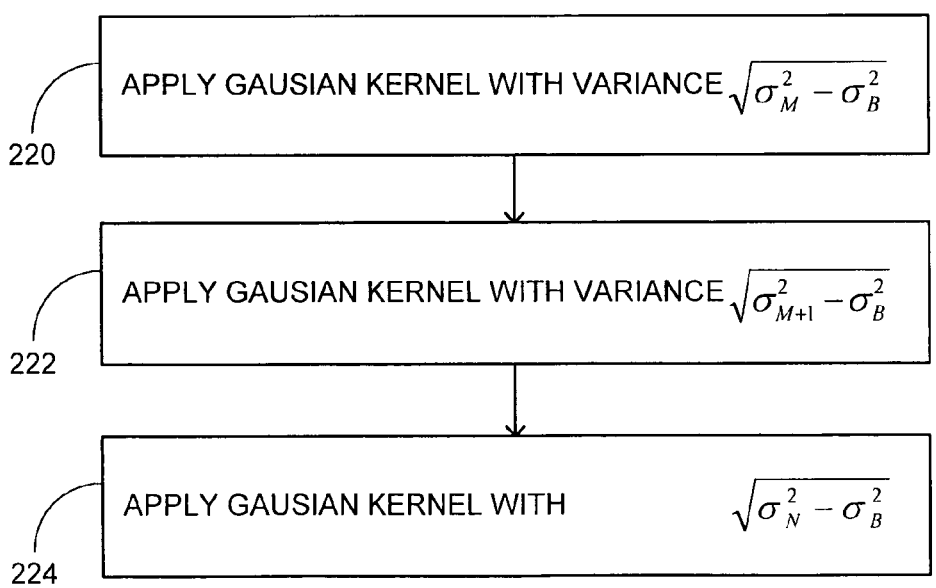
FIG. 5, is a schematic illustration of a method for generating a multi-scale representation (procedure 196 of FIG. 4), operative in accordance with another embodiment of the disclosed technique.

Reference is now made to FIG. 5, which is a schematic illustration of a method for generating a multi-scale representation (procedure 196 of FIG. 4), operative in accordance with another embodiment of the disclosed technique. In procedure 220, a first image of a set of images of the multi-scale representation is generated by applying a Gaussian kernel having scale factor of $\sqrt{\sigma_M^2 - \sigma_B^2}$ (i.e., scale factor), to the input image. $\sigma_B$ Is the scale factor of the Gaussian kernel corresponding to the input image (i.e., the Gaussian kernel corresponding to the blur level of the input image). $\sigma_M$ Is the scale factor of the first Gaussian kernel of a set of predetermined Gaussian kernels, which value is greater than $\sigma_B$. $\sigma_B$ is estimated by scale space level estimator 164 of FIG. 3. With reference to FIG. 3, multi-scale representation generator 166 generates the first image of the multi-scale representation of the input image by applying a first Gaussian difference kernel to the input image.

In procedure 222, a second image of the multi-scale representation of the input image is generated by applying a Gaussian kernel having scale factor of $\sqrt{\sigma_{M+1}^2 - \sigma_B^2}$ to the input image. With reference to FIG. 3, multi-scale representation generator 166 generates the second image of the multi-scale representation of the input image by applying a second Gaussian difference kernel to the input image.

It is noted that, each of the images of the multi-scale representation of the input image are created by applying each of the Gaussian difference kernels having scale factor greater than $\sigma_B$, to the input image, starting at $\sqrt{\sigma_M^2 - \sigma_B^2}$ and finishing at $\sqrt{\sigma_N^2 - \sigma_B^2}$. In procedure 224, a last image in the multi-scale representation is generated by applying a Gaussian kernel having scale factor of $\sqrt{\sigma_N^2 - \sigma_B^2}$ to the input image. It is noted that, the number of images N (i.e., the actual number of images in the multi-scale representation is N−(M+1)), as well as the scale factors $\sigma_1, \sigma_2, \sigma_3 \ldots \sigma_N$ are predetermined by a user.

Reference is now made to FIGS. 6A and 6B. FIG. 6A is a schematic illustration of a multi-scale representation of an input focused image, generally referenced 250, constructed in accordance with a further embodiment of the disclosed technique. FIG. 6B is a schematic illustration of a multi-scale representation of an input blurred image, generally referenced 264, constructed in accordance with another embodiment of the disclosed technique.

With reference to FIG. 6A, multi-scale representation 250 includes a focused input image 252, a first convolved image 254, a second convolved image 256, an M convolved image 258, an (M+1) convolved image 260, and an N convolved image 262. Focused original image 252 can be modeled as an image convolved with a Gaussian kernel having scale factor of $\sigma_0 = 0$. Multi-scale representation generator 166 (FIG. 3) generates first convolved image 254 by convolving original image 252 with a Gaussian kernel having scale factor of $\sigma_1$.

Multi-scale representation generator 166 generates second convolved image 256 by convolving original image 252 with a Gaussian kernel having scale factor of $\sigma_2$. The value of $\sigma_2$ is greater than that of $\sigma_1$. Multi-scale representation generator 256 generates M convolved image 258 by convolving original image 252 with a Gaussian kernel having scale factor of $\sigma_M$. The value of $\sigma_M$ is greater than that of $\sigma_{M+1}$ (i.e., the scale factor of the previous Gaussian kernel, of the set of predetermined Gaussian kernels, —not shown). Multi-scale representation generator 166 generates (M+1) convolved image 260 by convolving original image 252 with a Gaussian kernel having scale factor of $\sigma_{M+1}$. The value of $\sigma_{M+1}$ is greater than that of $\sigma_M$.

Multi-scale representation generator 166 generates all the images of multi-scale representation 250 in a manner similar to that described herein above with reference to FIG. 6A. The last image of multi-scale representation 250 is N convolved image 262. Multi-scale representation generator 166 generates N convolved image 262 by convolving original image 252 with a Gaussian kernel having scale factor of $\sigma_N$. The value of $\sigma_N$ is greater than that of any of the previous variances.

With reference to FIG. 6B, multi-scale representation 264 includes a blurred input image 266, an M convolved image 268, an M+1 convolved image 270, and an N convolved image 272. Blurred original image 266 can be modeled as an image convolved with a Gaussian kernel having scale factor of $\sigma_B$. Multi-scale representation generator 166 (FIG. 3) generates a first convolved image (not shown) by convolving original image 266 with a Gaussian kernel having scale factor of $\sigma_1$–$\sigma_B$. In case the value of $\sigma_B$ is greater than that of $\sigma_1$, Multi-scale representation generator 166 does not generate the first convolved image and starts the multi-scale representation of original image 266 from a second convolved image.

Multi-scale representation generator 166 (FIG. 3) generates the second convolved image by convolving original image 266 with a Gaussian kernel having scale factor of $\sigma_2$–$\sigma_B$. In case the value of $\sigma_B$ is greater than that of $\sigma_2$, Multi-scale representation generator 166 does not generate the second convolved image and starts the multi-scale representation of original image 266 from a third convolved image.

In the example set forth in FIG. 6B, the first Gaussian kernel of the predetermined set of Gaussian kernels having scale factor higher than $\sigma_B$, is Gaussian kernel M. Multi-scale representation generator 166 (FIG. 3) generates M convolved image 268 by convolving original image 266 with a Gaussian kernel having scale factor of $\sigma_M$–$\sigma_B$. It is noted that, M convolved image 258 of FIGS. 6A and M convolved image 268 of FIG. 6B are substantially similar, since convolution with a Gaussian kernel obeys equation (1) as described herein above.

Multi-scale representation generator 166 generates all the images of multi-scale representation 264 in a manner similar to that described herein above with reference to FIG. 6B. The last image of multi-scale representation 264 is the N convolved image 272. Multi-scale representation generator 166 generates N convolved image 272 by convolving original image 264 with a Gaussian kernel having scale factor of $\sigma_N$–$\sigma_B$.

It is noted that, image M, M+1, . . . N of multi-scale representation 250 (FIG. 6A) and images of M, M+1, . . . N of multi-scale representation 264 (FIG. 6B) are substantially similar, respectively. It is further noted that, the number of images in multi-scale representation 264 is (N–(M+1)). It will be appreciated by persons skilled in the art that the disclosed technique is not limited to what has been particularly shown and described hereinabove. Rather the scope of the disclosed technique is defined only by the claims, which follow.

The invention claimed is:

1. A method for generating a multi-scale representation of a blurred input image, the blurred input image corresponding to an initial blur Gaussian kernel $\sigma_{blur}$, the method comprising the steps of:

estimating, by a scale space level estimator, said initial blur Gaussian kernel $\sigma_{blur}$ corresponding to said blurred input image;

determining, by a multi-scale representation generator, a set of Gaussian difference kernels according to said initial blur Gaussian kernel $\sigma_{blur}$, and according to a predetermined set of Gaussian kernels, each of said set of Gaussian difference kernels being determined according to formula $\sigma_{diff}=\sqrt{\sigma_{required}^2-\sigma_{blur}^2}$, wherein $\sigma_{diff}$ is a value of variance of a specific Gaussian difference kernel, and $\sigma_{required}$ is a value of variance of a selected one of said set of predetermined Gaussian kernels, corresponding to said specific Gaussian difference kernel; and generating, by the multi-scale representation generator, a multi-scale representation of said input image by applying each of said set of Gaussian difference kernels on said input image.

2. The method according to claim 1, further comprising the procedure of receiving said input image before said procedure of estimating.

3. The method according to claim 1, wherein said method further comprising a procedure of performing at least one of feature detection and feature classification, on said multi-scale representation of said input image, after said procedure of generating.

4. The method according to claim 1, wherein said method further comprising a procedure of performing at least one of object recognition and object classification, on said multi-scale representation of said input image, after said procedure of generating.

5. The method according to claim 1, wherein said method further comprising a procedure of performing at least one of image classification and shape analysis, on said multi-scale representation of said input image, after said procedure of generating.

6. The method according to claim 1, wherein said procedure of determining a set of Gaussian difference kernels includes a sub procedure of determining said predeteremined set of Gaussian kernels, and wherein each of the Gaussian kernels of said predetermined set of Gaussian kernels, has scale factor higher than that of a previous Gaussian kernel of said predetermined set of Gaussian kernels.

7. The method according to claim 1, wherein said procedure of generating said multi-scale representation is performed by applying each Gaussian difference kernel of said set of Gaussian difference kernels to said input image.

8. The method according to claim 1, wherein said input image is a blurred version of a hypothetic focused image, said input image being substantially similar to an image received by applying a Gaussian kernel, having said estimated scale factor, on said hypothetic focused image.

9. A system for generating a multi-scale representation of a blurred input image, the blurred input image corresponding to an initial blur Gaussian kernel $\sigma_{blur}$, the system comprising:

a scale space level estimator for estimating said initial blur Gaussian kernel $\sigma_{blur}$ corresponding to said blurred input image;

a multi-scale representation generator coupled with said scale space level estimator, for receiving said estimated scale factor, determining a set of Gaussian difference kernels according to said initial blur Gaussian kernel $\sigma_{blur}$ and according to a predetermined set of Gaussian kernels, and for generating a multi-scale representation of said input image by applying each of said set of Gaussian difference kernels to said input image, wherein said multi-scale representation generator determining of said set of Gaussian difference kernels according to the following formula: $\sigma_{diff}=\sqrt{\sigma_{required}^2-\sigma_{blur}^2}$, wherein $\sigma_{diff}$ is the value of variance of a specific Gaussisn difference kernel, and $\sigma_{required}$ is the value of variance of a selected one of said set of predetermined Gaussian kernels.

10. The system according to claim 9, wherein said system further comprises an image source coupled with said scale space level estimator, for providing said input image to said scale space level estimator.

11. The system according to claim 10, wherein said image source is selected from the list consisting of:
an image capture device;
a storage unit storing the input image; and
a communication interface receiving the input image from an external source.

12. The system according to claim 9, wherein said system further comprises a visual processor coupled with said multi-scale representation generator, said visual processor performing at least one of feature detection and feature classification, on said multi-scale representation of said input image.

13. The system according to claim 9, wherein said system further comprises a visual processor coupled with said multi-scale representation generator, said visual processor performing at least one of object recognition and object classification, on said multi-scale representation of said input image.

14. The system according to claim 9, wherein said system further comprises a visual processor coupled with said multi-scale representation generator, said visual processor performing at least one of image classification and shape analysis, on said multi-scale representation of said input image.

15. The system according to claim 9, wherein said multi-scale representation generator determines said predetermined set of Gaussian kernels, and wherein each of said predetermined set of Gaussian kernels has scale factor higher than that of a previous Gaussian kernel of said predetermined set of Gaussian kernels.

16. The system according to claim 9, wherein said multi-scale representation generator generates said multi-scale representation by applying each Gaussian difference kernel of said set of Gaussian difference kernels to said input image.

17. The system according to claim 9, wherein said input image is a blurred version of a hypothetic focused image, said input image being substantially similar to an image received by applying a Gaussian kernel, having said estimated scale factor, on said hypothetic focused image.

* * * * *